United States Patent
Yu et al.

(10) Patent No.: US 7,568,536 B2
(45) Date of Patent: Aug. 4, 2009

(54) OMNI-DIRECTIONAL ROBOT CLEANER

(75) Inventors: Hung-Hsiu Yu, Changhua County (TW);
Shou-Ren Chen, Taichung (TW);
Yu-Lun Ho, Taipei County (TW);
Wei-Han Wang, Taipei County (TW);
Fang Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 301 days.

(21) Appl. No.: 11/524,478

(22) Filed: Sep. 21, 2006

(65) Prior Publication Data

US 2007/0272463 A1 Nov. 29, 2007

(30) Foreign Application Priority Data

May 23, 2006 (TW) ............................... 95118246 A

(51) Int. Cl.
*B62D 6/00* (2006.01)
(52) U.S. Cl. .................... 180/6.2; 180/168; 180/169; 700/245; 318/568.12; 318/567; 318/587; 15/319
(58) Field of Classification Search ................ 180/6.2, 180/168, 169; 700/245; 318/568.12, 567, 318/587; 15/319
See application file for complete search history.

(56) References Cited

U.S. PATENT DOCUMENTS

| | | | | | |
|---|---|---|---|---|---|
| 5,109,566 | A | * | 5/1992 | Kobayashi et al. ............. | 15/319 |
| 5,353,224 | A | * | 10/1994 | Lee et al. ...................... | 701/25 |
| 5,440,216 | A | * | 8/1995 | Kim ............................ | 318/587 |
| 5,622,236 | A | * | 4/1997 | Azumi et al. ................ | 180/168 |
| 5,650,702 | A | * | 7/1997 | Azumi ........................ | 318/587 |
| 6,442,476 | B1 | * | 8/2002 | Poropat ...................... | 701/207 |
| 6,496,754 | B2 | * | 12/2002 | Song et al. .................. | 700/245 |
| 6,752,684 | B1 | * | 6/2004 | Lee ............................. | 446/456 |
| 6,841,963 | B2 | * | 1/2005 | Song et al. ............. | 318/568.12 |

(Continued)

FOREIGN PATENT DOCUMENTS

JP 4-221524 A 8/1992

(Continued)

*Primary Examiner*—Lesley D Morris
*Assistant Examiner*—Marlon A Arce
(74) *Attorney, Agent, or Firm*—Birch, Stewart, Kolasch & Birch, LLP

(57) ABSTRACT

An omni-directional robot cleaner, composed of a platform and a plurality of driving units for driving and controlling the movement of the platform, in which the platform further comprises: a sensing unit, for obstacle detection; a cleaning unit, for collecting and removing dust and dirt; a processing unit, capable of receiving signals transmitted from the sensing unit while planning and mapping a travel path accordingly; and a power unit, for providing power to the omni-directional robot cleaner while managing the same. Moreover, each driving unit of the plural driving units is comprised of an omni-directional wheel and an actuator for driving the corresponding omni-directional wheel to rotate omni-directionally, by which the platform is enabled to move continuously while changing its moving direction simultaneously so as to free the robotic cleaner from the shortcomings of those conventional autonomous cleaner, such as poor maneuverability, poor mobility and insufficient degree-of-freedom regarding to the driving of the cleaner. Therefore, not only the operation mobility of the robotic cleaner is enhanced, but also the moving agility of the same is greatly improved.

5 Claims, 4 Drawing Sheets

U.S. PATENT DOCUMENTS

| | | |
|---|---|---|
| 6,868,307 B2 * | 3/2005 | Song et al. ................. 700/245 |
| 6,883,201 B2 * | 4/2005 | Jones et al. ................... 15/319 |
| 7,024,278 B2 * | 4/2006 | Chiappetta et al. .......... 700/245 |
| 7,031,805 B2 * | 4/2006 | Lee et al. .................... 700/245 |
| 7,188,000 B2 * | 3/2007 | Chiappetta et al. .......... 700/245 |
| D548,903 S * | 8/2007 | Chun et al. ................. D32/21 |
| 2005/0153629 A1 | 7/2005 | Byun et al. |
| 2005/0235451 A1 | 10/2005 | Yan |

FOREIGN PATENT DOCUMENTS

| | | |
|---|---|---|
| JP | 2003-305671 A | 10/2003 |
| TW | 346810 U | 12/1998 |
| TW | I 262777 B | 10/2006 |

* cited by examiner

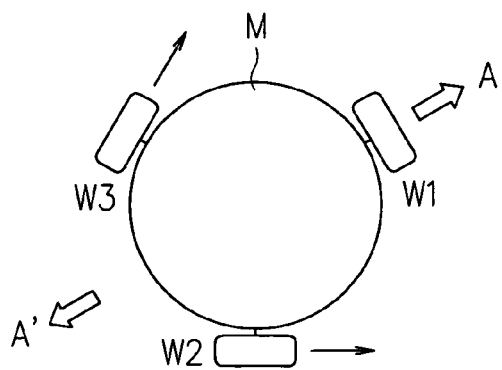
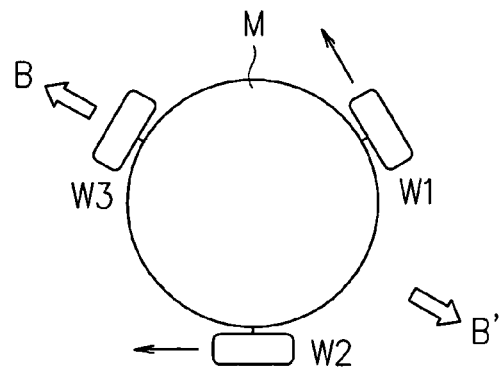
FIG. 5A  FIG. 5B
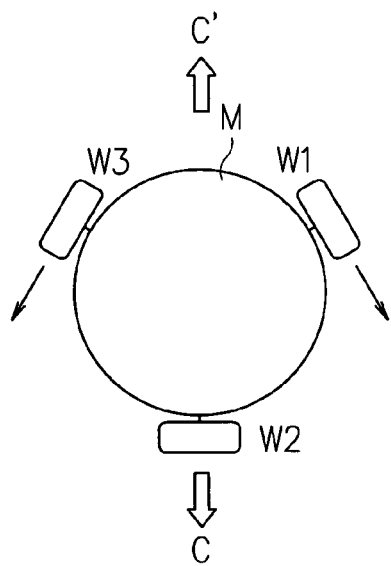
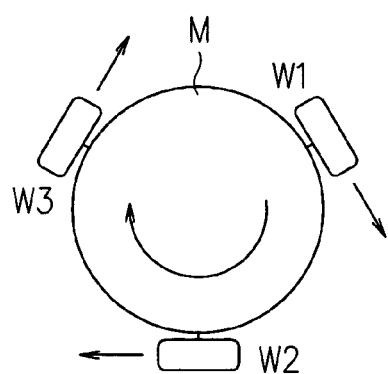
FIG. 5C  FIG. 5D

OMNI-DIRECTIONAL ROBOT CLEANER

FIELD OF THE INVENTION

The present invention relates to an omni-directional robot cleaner, and more particularly, to a novel autonomous mobile cleaner capable of adopting a means of motion vector for defining its moving position from an original position thereof and thus enabling the same to update its motion vector at any time and instantly change it moving direction accordingly, that the omni-directional robot cleaner is able to move forward, backward, sideway in a random direction as well as rotate in a continuous manner and this it is free from the shortcomings of those conventional autonomous cleaner, such as poor maneuverability, poor mobility and insufficient degree-of-freedom regarding to the driving of the cleaner. Therefore, not only the operation mobility of the robotic cleaner is enhanced, but also the moving agility of the same is greatly improved.

BACKGROUND OF THE INVENTION

Generally, a conventional autonomous mobile cleaner is carried to move by a plurality of common wheels, driven to rotate by a motor. Therefore, the conventional autonomous mobile cleaner can be driven to turn by the rotational speed difference between those wheels as the operating cleaner is running into obstacles like a wall or a drop of stairs. It is known that the turning of a conventional autonomous mobile cleaner carried by common wheels can be achieved in the following fashions:
  (1) As the platform of the conventional autonomous mobile cleaner is moved to a specific location and stopped completely, the wheels are driven to turn toward a random direction while not rotating, and then are driven to rotate after the turn is complete. It is noted that, to turn a cease-rotating wheel, a comparatively larger friction must be overcame, not to mention that the aforesaid stop-turn-rotate fashion is time consuming. Therefore, the aforesaid turning fashion will adversely affect the moving efficiency of the autonomous mobile cleaner.
  (2) As the platform is approaching a specific location, the rotating wheel is driven to turn when the platform is still in motion. It is noted that, to enable the platform to negotiate a turn while it is still in motion, the motor control will be much complicated and the resulting turn radius will be larger. Therefore, the aforesaid turning fashion will cause the autonomous mobile cleaner to have blind spot for cleaning.

Hence, as the common wheel can not instantly turn and move in a random direction, the moving efficiency as well as the agility of the conventional autonomous mobile cleaner are insufficient and unsatisfactory.

Please refer to FIG. 1, which shows a self-traveling type vacuum cleaner disclosed in JP Pat. No. 4221524. The self-traveling type vacuum cleaner 10 of FIG. 1 employs two driving wheels 12 and a passive wheel as the moving mechanism for carrying the platform 11 to move, wherein the two driving wheels 12 are driven to rotate respectively by the two independent motors 14. It is noted that the moving mechanism of the vacuum cleaner 10 is the most popular among conventional autonomous mobile cleaners. As the operating vacuum cleaner 10 is running into an obstacle, the two motors 14 are controlled to cause the generating of a speed difference between the two rotating driving wheels 12 for enabling the platform 11 to turn accordingly. As the platform 11 is turning, the passive wheel 13 will follow. However, the abovementioned moving mechanism still suffer from the comparatively larger friction while turning, and it is still not able to turn and move in a random direction instantly at will. Therefore, the mobility of the abovementioned vacuum cleaner 10 is not preferred.

Please refer to FIG. 2, which shows a spherical wheel vehicle disclosed in JP Pat. No. 2003305671. The spherical wheel vehicle 20 of FIG. 2 employs more than two spherical driving wheels 22 as the moving mechanism for carrying the platform 21 to move omni-directionally. By the aforesaid moving mechanism, even if colliding with an obstruction, it is safe because a wheel body of each spherical driving wheel 22 merely turns inside the wheel shell thereof, and a proceeding direction can be easily changed. However, since the forgoing spherical driving wheels 22 can not be driven to rotate directly by motors, a power transmission mechanism is required for transmitting power from the motors to each spherical driving wheels 22, by <which each spherical driving wheel 22 is driven to rotate by friction. Therefore, some power can be lost when the power transmission mechanism slips and thus the motion accuracy of the spherical wheel vehicle 20 can be adversely affected, not to mention that the overall driving mechanism of the spherical wheel vehicle 20 will be much more complicated.

SUMMARY OF THE INVENTION

In view of the disadvantages of prior art, the primary object of the present invention is to provide a novel omni-directional robot cleaner, adopting a means of motion vector for defining its moving position from an original position thereof and thus enabling the same to update its motion vector at any time and instantly change it moving direction accordingly, that the omni-directional robot cleaner is able to move forward, backward, sideway in a random direction as well as rotate in a continuous manner and this it is free from the shortcomings of those conventional autonomous cleaner, such as poor maneuverability, poor mobility and insufficient degree-of-freedom regarding to the driving of the cleaner. Therefore, not only the operation mobility of the robotic cleaner is enhanced, but also the moving agility of the same is greatly improved.

To achieve the above object, the present invention provide an omni-directional robot cleaner, which comprises:
  a sensing unit, for obstacle detection;
  a cleaning unit, for collecting and removing dust and dirt;
  a processing unit, capable of receiving signals transmitted from the sensing unit while planning and mapping a travel path accordingly;
  a power unit, for providing power to the omni-directional robot cleaner while managing the same;
  a platform, for supporting the aforesaid units; and
  a plurality of driving units, for driving and controlling the movement of the platform, each being composed of an omni-directional wheel and an actuator.

Preferably, there are at least three driving units configured in the omni-directional robot cleaner, whereas all the driving units configured in the omni-directional robot cleaner are equiangularly spaced from each other.

Preferably, the omni-directional wheels of the plural driving units are capable of being enabled to rotate at the same speed.

Preferably, the actuator can be a motor.

Preferably, the cleaning unit can be a device selected from the group consisting of a brush, a vacuuming apparatus, and the like.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 5A to FIG. 5D shows various motions capable of being executed by an omni-directional robot cleaner of the invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
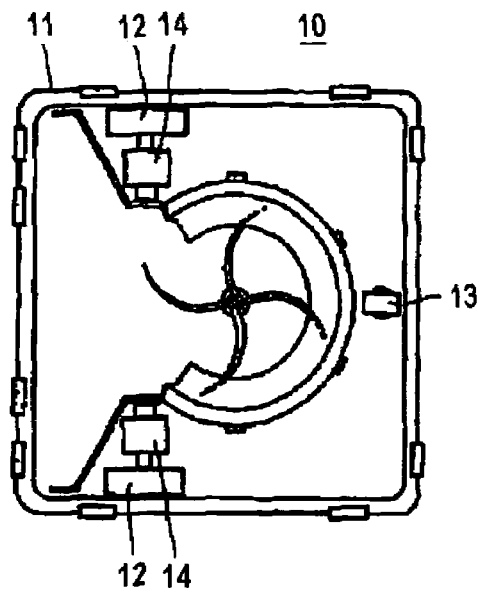
FIG. 1 shows a self-traveling type vacuum cleaner disclosed in JP Pat. No. 4221524.
Figure 2:
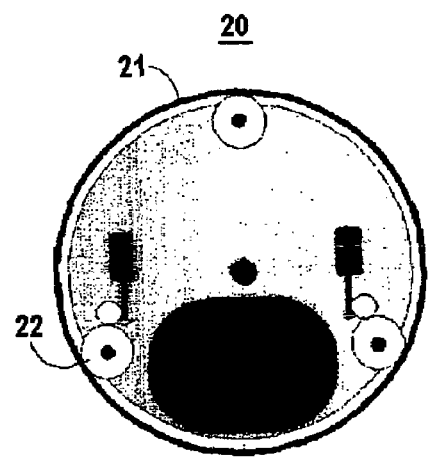
FIG. 2 shows a spherical wheel vehicle disclosed in JP Pat. No. 2003305671.
Figure 3:
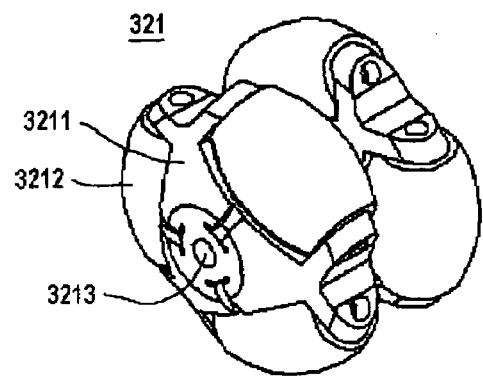
FIG. 3 shows the outlook of a conventional omni-directional wheel set.

Please refer to FIG. 3, which shows the outlook of a conventional omni-directional-wheel set. The omni-directional wheel 321 of FIG. 3 is unique because it rolls freely in two directions. In one direction, it rolls like a normal wheel. It can also roll laterally because of the smaller rollers spread about its circumference. The omni-directional wheel 321, which has three free rollers 3212 mounted on the rim of the main wheel 3211 while being equiangularly spaced, is characterized in that the main wheel 3211 can be driven to rotate with respect to the central axis 3213 thereof while the three free rollers 312 are rotating in a rotation direction perpendicular to the rotation of the main wheel 3211. By conveying a platform with the aforesaid omni-directional wheel, the platform is enabled to move continuously and change its moving direction simultaneously.

By the use of the omni-directional wheel similar to the aforesaid omni-directional wheel 321, an improved robot cleaner is able to move omni-directionally. Please refer to FIG. 4, which is a schematic diagram showing an omni-directional robot cleaner according to a preferred embodiment of the invention. The omni-directional robot cleaner 30 has a platform having a plurality of driving units 32 mounted on the circumference thereof while being equiangularly spaced, in that each driving unit 32 is composed of an omni-directional wheel 321 and an actuator 322 while the actuator 322 can be a motor capable of independently controlling the corresponding omni-directional wheel 321. In the preferred embodiment shown in FIG. 4, three are three driving units 32. However, the amount of driving unit can be determined with respect to the size of the platform 32 or the size of the omni-directional wheel 321, and thus is not limited by the embodiment of FIG. 4. Moreover, the platform 31 is comprised of a sensing unit 311, a cleaning unit 312, a processing unit 313 and a power unit 314, wherein the sensing unit 311 is used for detecting obstruction in the ambient environment of the platform 31 so as to obtain information such as the distance between the platform and a detected obstacle, the shape of the detected obstacle, etc; the cleaning unit 312 is used for or collecting and removing dust and dirt, which can be a device selected from the group consisting of a brush, a vacuuming apparatus, and the like; the processing unit 313 is capable of receiving signals transmitted from the sensing unit 311 while controlling the operation of each actuator 322 accordingly for planning and mapping a travel path; the power unit 313 is used for providing power to the omni-directional robot cleaner 30 while managing the same. Thereby, an operating omni-directional robot cleaner 30 is able to use the sensing unit 311 to detect obstacles existed in it ambient environment, and then use the processing unit 313 to control the three actuators 322 to drive the three omni-directional wheels 321 in respective according to the detection of the sensing unit 311 for maneuvering the omni-directional robot cleaner 30 around the detected obstacle by changing its moving direction at random.

There can be various operation modes defined in an omni-directional robot cleaner 30 of the invention, that are only a few thereof being showing in FIG. 5A to FIG. 5D. For illustration, the platform M shown in FIG. 5A to FIG. 5D has three omni-directional wheels W1, W2, and W3, and all of the three omni-directional wheels W1, W2, and W3 can be enabled to rotate at the same speed.

In FIG. 5A, the omni-directional wheel W1 is stopped without rotating while the omni-directional wheel W2 is rotating clockwisely and the omni-directional wheel W3 is rotating counterclockwisely, by which the platform M is driven to in the direction specified by the arrow A. Similarly, when the omni-directional wheel W1 is stopped without rotating while the omni-directional wheel W2 is rotating counterclockwisely and the omni-directional wheel W3 is rotating clockwisely, the platform M is driven to in the direction specified by the arrow A'.

In FIG. 5B, the omni-directional wheel W3 is stopped without rotating while the omni-directional wheel W1 is rotating clockwisely and the omni-directional wheel W2 is rotating counterclockwisely, by which the platform M is driven to in the direction specified by the arrow B. Similarly, when the omni-directional wheel W3 is stopped without rotating while the omni-directional wheel W1 is rotating counterclockwisely and the omni-directional wheel W2 is rotating clockwisely, the platform M is driven to in the direction specified by the arrow B'.

In FIG. 5C, the omni-directional wheel W2 is stopped without rotating while the omni-directional wheel W3 is rotating clockwisely and the omni-directional wheel W1 is rotating counterclockwisely, by which the platform M is driven to in the direction specified by the arrow C. Similarly, when the omni-directional wheel W3 is stopped without rotating while the omni-directional wheel W1 is rotating counterclockwisely and the omni-directional wheel W3 is rotating clockwisely, the platform M is driven to in the direction specified by the arrow C'.

In FIG. 5D, when the omni-directional wheels W1, W2, and W3 are all enabled to rotate counterclockwisely, the platform M is driven to rotate clockwisely without moving. Similarly, when the omni-directional wheels W1, W2, and W3 are all enabled to rotate clockwisely, the platform M is driven to rotate counterclockwise without moving.

Figure 4:
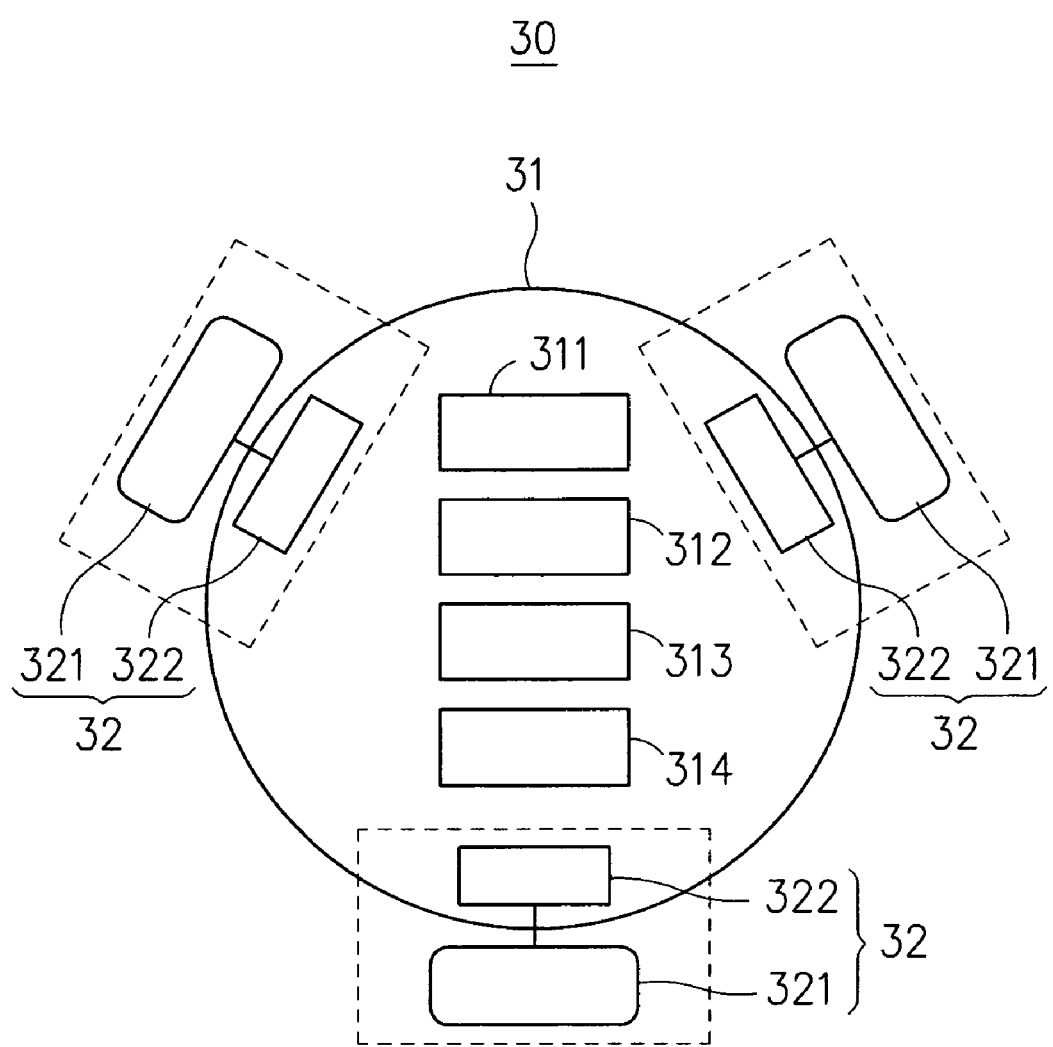
FIG. 4 is a schematic diagram showing an omni-directional robot cleaner according to a preferred embodiment of the invention.

In addition, by controlling the actuators 322, shown in FIG. 4, to enable speed differences to be generated between the corresponding omni-directional wheels W1, W2, and W3, the platform M can be driven to move in any direction at will.

Figure 6:
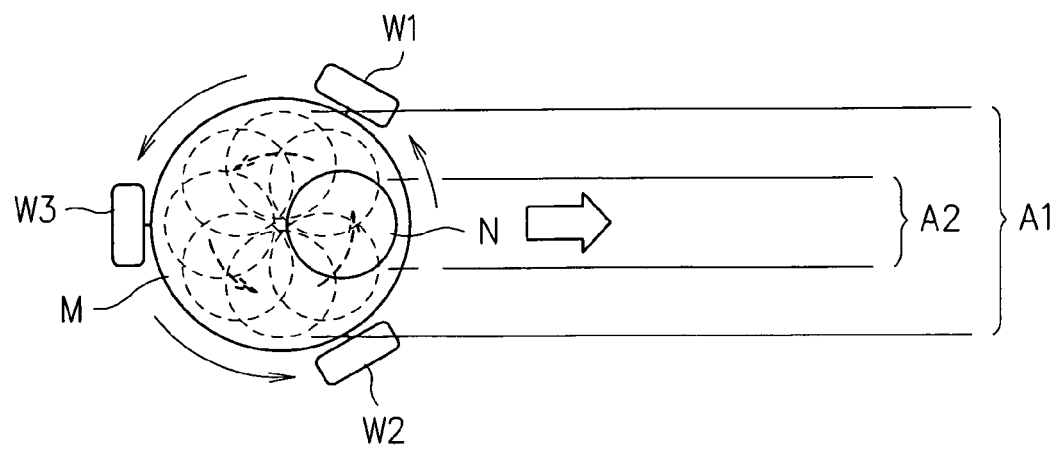
FIG. 6 shows an omni-directional robot cleaner operating in a planetary motion mode according to the present invention.

Moreover, please refer to FIG. 6 for an omni-directional robot cleaner operating in a planetary motion mode according a further embodiment of the present invention. As seen in FIG. 6, a planetary motion of platform M is enabled by the cooperation of the three omni-directional wheels W1, W2, and W3, i.e. the three omni-directional wheels W1, W2, and W3 are controlled to enabled the platform M to move linearly in a direction specified by the arrow while rotating simultaneously. By the planetary motion, the omni-directional robot cleaner can have comparatively wider cleaning area comparing with those operating in other modes but having the same amount of cleaning units N arranged therein. As seen in FIG. 6, the cleaning unit N of the platform M operating in other mode can only move forward linearly that is restrict to the narrower cleaning area A2 while the cleaning unit N of the platform M operating in planetary motion mode is rotating that a wider cleaning area A1 is achieved.

Figure 7:
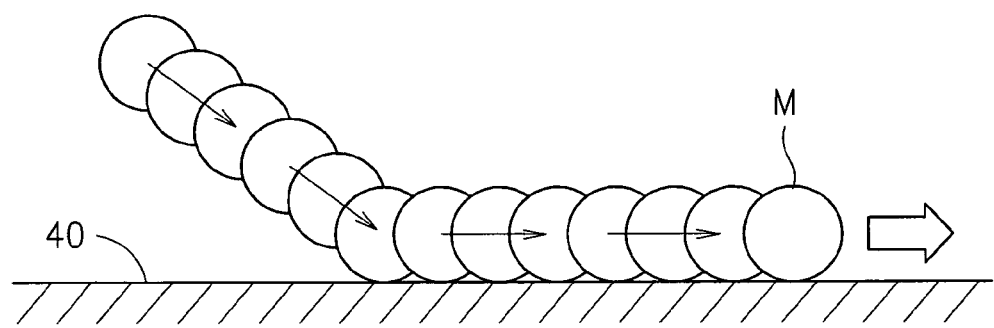
FIG. 7 shows a travel path of an omni-directional robot cleaner operating in a wall-following mode according to the present invention.
Figure 8:
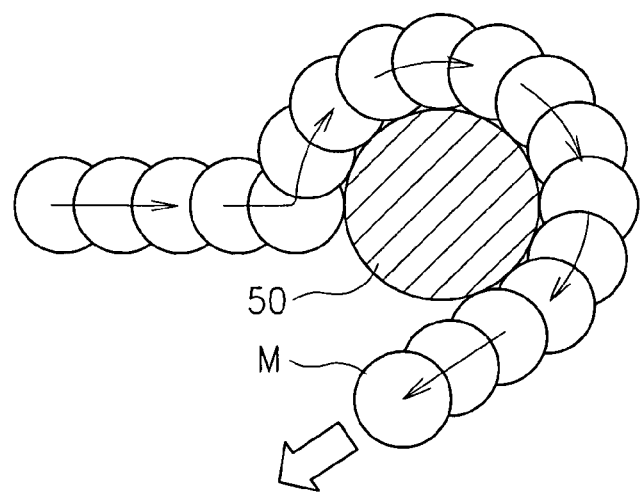
FIG. 8 shows a travel of an omni-directional robot cleaner operating in a column-following mode according to the present invention.

Furthermore, please refer to FIG. 7 and FIG. 8, which show a travel path of an omni-directional robot cleaner operating in a wall-following mode and a travel path of that in a column-following mode. In the wall-following mode shown in FIG. 7, different from the zigzagging path combing rotating and straight-line moving performed by those convention autonomous mobile cleaners in their wall-following mode, the omni-directional robot cleaner in wall-following mode is able to move while maintaining it contact to a wall 40 as soon as the omni-directional robot cleaner comes into contact with the wall 40, that is enabled by redefining motion vector coordinate to drive the platform M. By the cooperation of the wall-following mode and the planetary motion mode of FIG. 6, dust and dirt deposited at the corner of the wall can be removed completely. In addition, in the column-following mode shown in FIG. 8, the omni-directional robot cleaner is able to move while maintaining it contact to and circling a column 50 as soon as the omni-directional robot cleaner comes into contact with the column 50, that is enabled by redefining motion vector coordinate to drive the platform M. By the cooperation of the column-following mode and the planetary motion mode of FIG. 6, dust and dirt deposited at the foot of the column can be removed completely.

From the above description, the omni-directional robot cleaner is featuring in that:

(1) Efficient Path Changing Ability:

As the conventional autonomous mobile cleaner is zigzagging, i.e. moving in a traveling path of stop, turn 90 degrees, move a specific distance forward, step, turn 90 degrees again, and then move forward, so as to complete a Z-shaped turn, not only it is time consuming, but also it will cause the autonomous mobile cleaner to have blind spot for cleaning. However, the omni-directional robot cleaner of the invention can continuously change its coordinate of motion vector directly at a turn or at a location requiring path change, so that it can perform a smooth S-shaped turn and thus the efficiency of the omni-directional robot cleaner is greatly enhanced.

(2) Random Motion and Path Change:

As a conventional autonomous mobile cleaner is performing a random motion/path change, it is required to stop and reactivate at some point that the whole traveling path is not fluent and will waste a lot of time in the stopping and the reactivating. However, the omni-directional robot cleaner of the invention can continuously change its coordinate of motion vector directly at a turn, so that it can change its moving direction directly for proceeding to a random direction and thus the efficiency of the omni-directional robot cleaner is greatly enhanced.

It is noted that although the omni-directional wheel and the autonomous mobile cleaner are respectively known to those skilled in the art, there is no application that integrates omni-directional wheels in any autonomous mobile cleaner. By replacing the common wheels with omni-directional wheel while configuring a sensing unit, a processing unit and a power unit in the platform of the omni-directional robot cleaner of the invention, the omni-directional robot cleaner is free from the shortcomings of those conventional autonomous cleaner, such as poor maneuverability, poor mobility and insufficient degree-of-freedom regarding to the driving of the cleaner. Therefore, not only the operation mobility of the robotic cleaner is enhanced, but also the moving agility of the same is greatly improved.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An omni-directional robot cleaner, comprising:

a sensing unit, for obstacle detection;

a cleaning unit, for collecting and removing dust and dirt;

a processing unit, capable of receiving signals transmitted from the sensing unit while planning and mapping a travel path accordingly;

a power unit, for providing power to the omni-directional robot cleaner while managing the same;

a platform, for supporting the aforesaid units; and at least three driving units are configured in the omni-directional robot cleaner, for driving and controlling the movement of the platform, each being composed of an omni-directional wheel and an actuator, wherein said three omni-directional wheels can be identified as the first omni-directional wheel, the second omni-directional wheel and the third omni-directional wheel respectively, and wherein when the first omni-directional wheel is stopped without rotating while the second omni-directional wheel is rotating clockwisely and the third omni-directional wheel is rotating counterclockwisely, by which the platform is driven to in the direction specified by a first direction, when the first omni-directional wheel is stopped without rotating while the second omni-directional wheel is rotating counterclockwisely and the third omni-directional wheel is rotating clockwisely, the platform is driven to in the direction specified by a second direction that is the opposite direction of the first direction, when the third omni-directional wheel is stopped without rotating while the first omni-directional wheel is rotating clockwisely and the second omni-directional wheel is rotating counterclockwisely, by which the platform is driven to in the direction specified by a third direction, when the third omni-directional wheel is stopped without rotating while the first omni-directional wheel is rotating counterclockwisely and the second omni-directional wheel is rotating clockwisely, the platform is driven to in the direction specified by a forth direction that is the opposite direction of the third direction, and when the second omni-directional wheel is stopped without rotating while the third omni-directional wheel is rotating clockwisely and the first omni-directional wheel is rotating counterclockwisely, by which the platform is driven to in the direction specified by a fifth direction, and when the second omni-directional wheel is stopped without rotating while the first omni-directional wheel is rotating counterclockwisely and the third omni-directional wheel is rotating clockwisely, the platform is driven to in the direction specified by a sixth direction that is the opposite direction of the fifth direction, and when all the three omni-directional wheels are all enabled to rotate counterclockwisely, the platform is driven to rotate clockwisely without moving and when all the three omni-directional wheels are all enabled to rotate clockwisely, the platform is driven to rotate counterclockwisely without moving.

2. The omni-directional robot cleaner of claim 1, wherein all the driving units configured in the omni-directional robot cleaner are equiangularly spaced from each other.

3. The omni-directional robot cleaner of claim 1, wherein the omni-directional wheels of the plural driving units are capable of being enabled to rotate at the same speed.

4. The omni-directional robot cleaner of claim 1, wherein each actuator is a motor.

5. The omni-directional robot cleaner of claim 1, wherein the cleaning unit is a device selected from the group consisting of a brush, a vacuuming apparatus, and the like.

* * * * *